US012687862B2

(12) United States Patent
Watanabe

(10) Patent No.: US 12,687,862 B2
(45) Date of Patent: Jul. 21, 2026

(54) INFORMATION PROCESSING APPARATUS DETERMINING MOVING DIRECTION OF A MOVABLE UNIT BASED ON OBJECTS EXISTING AROUND THE MOVABLE UNIT

(71) Applicant: CANON KABUSHIKI KAISHA, Tokyo (JP)

(72) Inventor: Yuma Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 18/663,369

(22) Filed: May 14, 2024

(65) Prior Publication Data

US 2024/0427352 A1     Dec. 26, 2024

(30) Foreign Application Priority Data

Jun. 23, 2023     (JP) ................................. 2023-103128

(51) Int. Cl.
G05D 1/693          (2024.01)
(52) U.S. Cl.
CPC ..................................... G05D 1/693 (2024.01)
(58) Field of Classification Search
CPC .................................................... G05D 1/693
See application file for complete search history.

(56) References Cited

U.S. PATENT DOCUMENTS

| | | | | |
|---|---|---|---|---|
| 6,025,790 A | * | 2/2000 | Saneyoshi ............ | H04N 13/239 |
| | | | | 348/E13.016 |
| 6,281,786 B1 | * | 8/2001 | Adachi ................. | G01S 13/862 |
| | | | | 367/909 |
| 11,585,920 B2 | * | 2/2023 | Rider ........................ | G01S 7/41 |
| 11,604,470 B2 | * | 3/2023 | Nister .................... | B60W 30/09 |
| 11,747,444 B2 | * | 9/2023 | Chattopadhyay ....... | G01S 17/42 |
| | | | | 356/5.01 |
| 2002/0044048 A1 | * | 4/2002 | Watanabe .............. | G06V 20/58 |
| | | | | 340/436 |
| 2002/0107637 A1 | * | 8/2002 | Okamura ................ | G01S 7/412 |
| | | | | 342/455 |
| 2018/0152912 A1 | * | 5/2018 | Lin ........................ | H04W 4/023 |
| 2020/0252838 A1 | * | 8/2020 | Akdeniz ........... | H04W 36/0009 |
| 2021/0208272 A1 | * | 7/2021 | Lavian .................... | H03L 7/091 |
| 2022/0382287 A1 | * | 12/2022 | Van De Velde ....... | G05D 1/226 |

FOREIGN PATENT DOCUMENTS

JP          2019-144612 A      8/2019

* cited by examiner

*Primary Examiner* — Ramsey Refai
(74) *Attorney, Agent, or Firm* — VENABLE LLP

(57)          ABSTRACT
An information processing apparatus includes a memory storing instructions, and a processor configured to execute the instructions to acquire information about a group consisting of a plurality of objects that exist around a movable unit and are each configured to be movable, acquire information about a direction from the movable unit to a destination, and determine a moving direction of the movable unit according to information about the group and information about the direction from the movable unit to the destination.

10 Claims, 6 Drawing Sheets

FIG. 6A                    FIG. 6B

INFORMATION PROCESSING APPARATUS DETERMINING MOVING DIRECTION OF A MOVABLE UNIT BASED ON OBJECTS EXISTING AROUND THE MOVABLE UNIT

BACKGROUND

Technical Field

One of the aspects of the embodiments relates to an image processing apparatus configured to control movement of a movable unit (movable body or vehicle).

Description of Related Art

An autonomously movable unit, such as an automated guided vehicle, a self-driving vehicle, and a robot, has recently used. Japanese Patent Laid-Open No. 2019-144612 discloses a structure configured to move a movable unit in the same direction as a velocity vector of a group where a plurality of moving obstacles around the movable unit are wholly regarded as the group, in order to suppress a collision between the movable unit and each obstacle.

In the structure disclosed in Japanese Patent Laid-Open No. 2019-144612, even if the same direction as the velocity vector of the group is different from a direction to the destination of the movable unit, the movable unit moves in the same direction as the velocity vector of the group, and thus it takes a long time for the movable unit to reach the destination.

SUMMARY

An information processing apparatus according to one of the aspects of the disclosure includes a memory storing instructions, and a processor configured to execute the instructions to acquire information about a group consisting of a plurality of objects that exist around a movable unit and are each configured to be movable, acquire information about a direction from the movable unit to a destination, and determine a moving direction of the movable unit according to information about the group and information about the direction from the movable unit to the destination.

Further features of various embodiments of the disclosure will become apparent from the following description of embodiments with reference to the attached drawings.

BRIEF DESCRIPTION OF THE DRAWINGS

FIGS. 6A, 6B, and 6C are conceptual diagrams for explaining a weight determination pattern according to a second embodiment.

DESCRIPTION OF THE EMBODIMENTS

Figure 1:
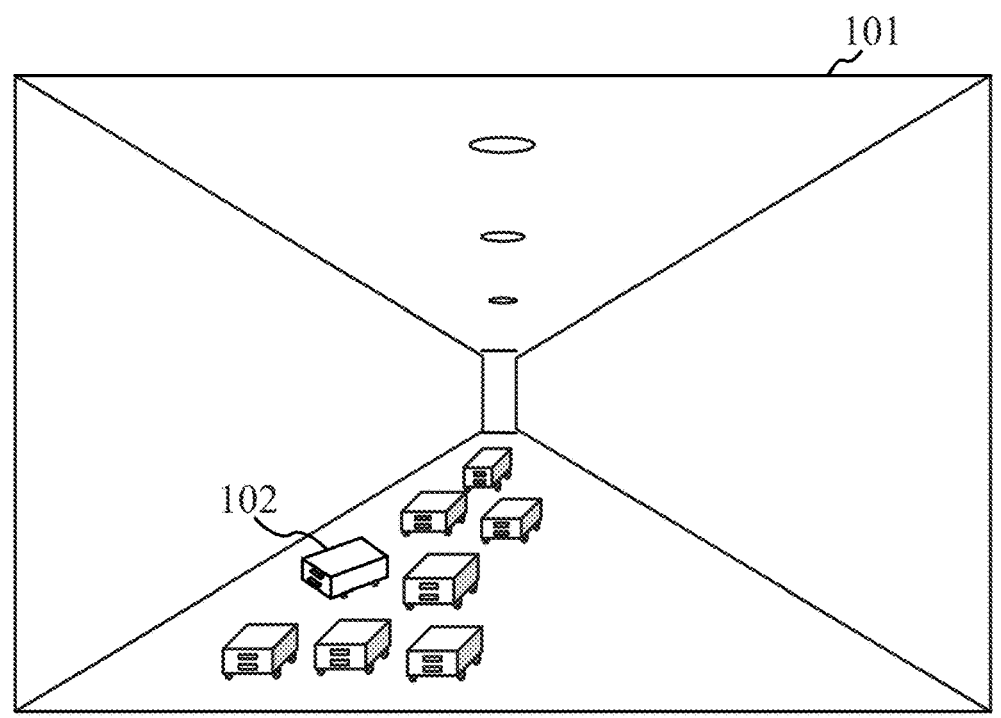
FIG. 1 illustrates an example of a usage scene of a movable unit including an information processing apparatus according to a first embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

First Embodiment

This embodiment will discuss an example that determines a moving direction of a movable unit according to information about a group consisting of a plurality of obstacles (a plurality of moving objects different from the movable unit) each of which exists around the movable unit and is configured movable, and information about a direction from the movable unit to the destination.

FIG. 1 illustrates an example of a usage scene of a movable unit including an information processing apparatus according to this embodiment. In this embodiment, space 101 inside a building is a region in which a movable unit 102 autonomously moves. Assume that the movable unit 102 is moving in a direction different from that of the group.

Figure 2:
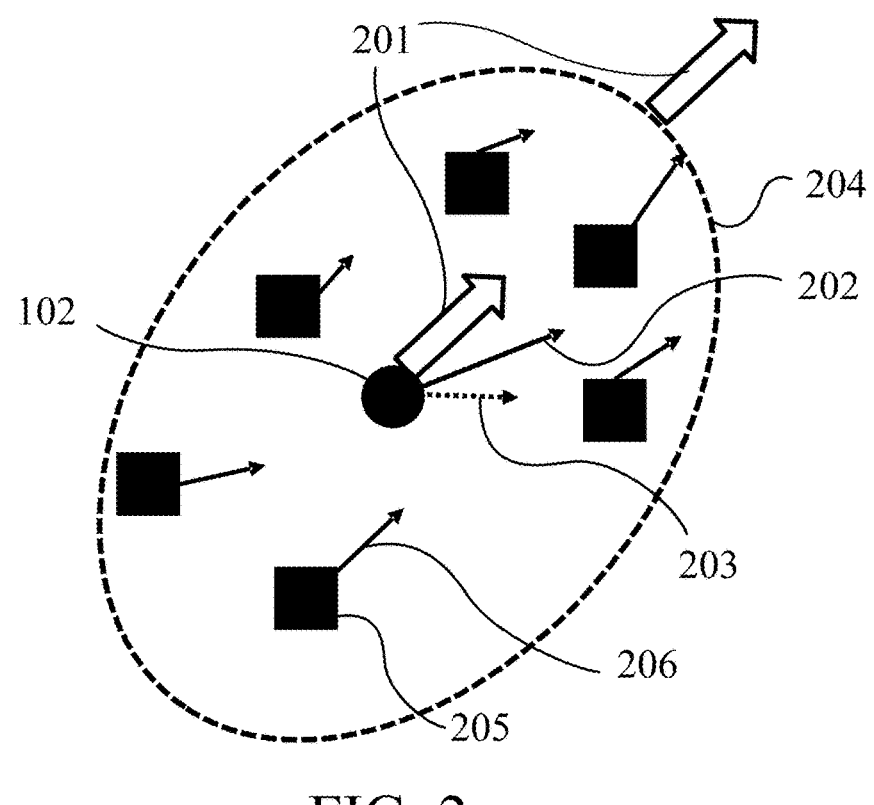
FIG. 2 is a conceptual diagram for explaining the principle of this embodiment.

FIG. 2 is a conceptual diagram for explaining the principle of this embodiment. Reference numeral 204 denotes a region considered to be a group. Reference numeral 205 denotes an obstacle (object) that constitutes the group. The destination is located in the right direction, reference numeral 201 denotes a moving direction of the group, reference numeral 203 denotes a direction from the movable unit 102 to the destination (referred to as a destination direction hereinafter), and reference numeral 206 denotes a moving direction of the movable unit 205. In this embodiment, the movable unit 102 does not move only in the moving direction 201 of the group, but rather moves in the direction 202 that is a combination with the destination direction 203. Thereby, the movable unit 102 can approach the destination while collisions with the group are avoided.

Figure 3:
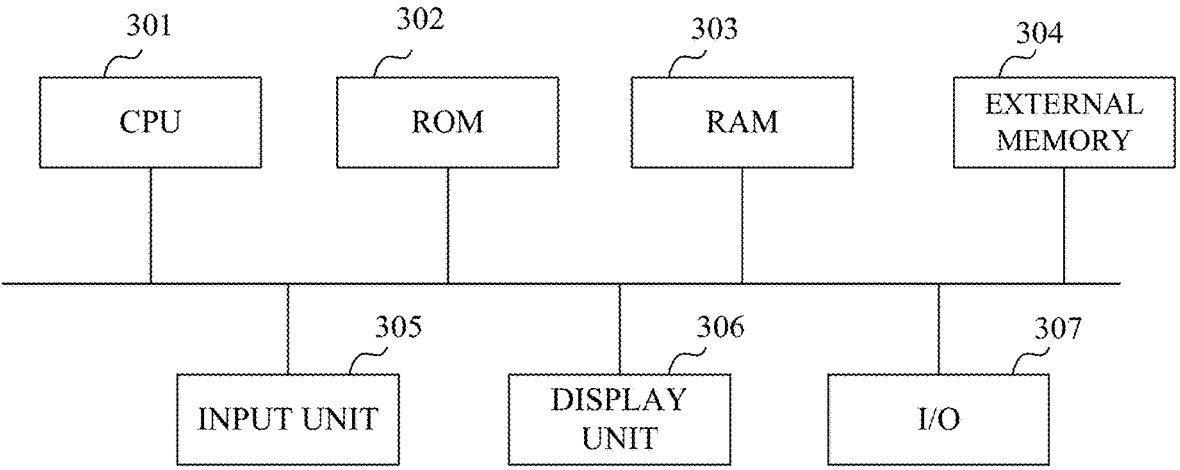
FIG. 3 illustrates a hardware configuration of the information processing apparatus according to the first embodiment.

FIG. 3 illustrates the hardware configuration of the information processing apparatus according to this embodiment. Reference numeral 301 denotes a central processing unit (CPU) configured to control the entire computer device. A read-only memory (ROM) 302 stores programs and parameters that do not require modification. Reference numeral 303 denotes a random-access memory (RAM) that temporarily stores programs and data supplied from an external device or the like. Reference numeral 304 denotes an external memory (external storage device) such as a hard disk drive or a memory card installed in the computer device. The external memory 304 may be fixed into the information processing apparatus or may be removably attached to it. Reference numeral 305 denotes an input unit, such as a keyboard, a mouse, and a robot controller, and performs processing related to inputting information and the like. Reference numeral 306 denotes a display apparatus configured to display a calculation result of the information processing apparatus. An input/output (I/O) 307 performs information communication via a communication interface and receives output information from various sensors and other information processing apparatuses.

Figure 4:
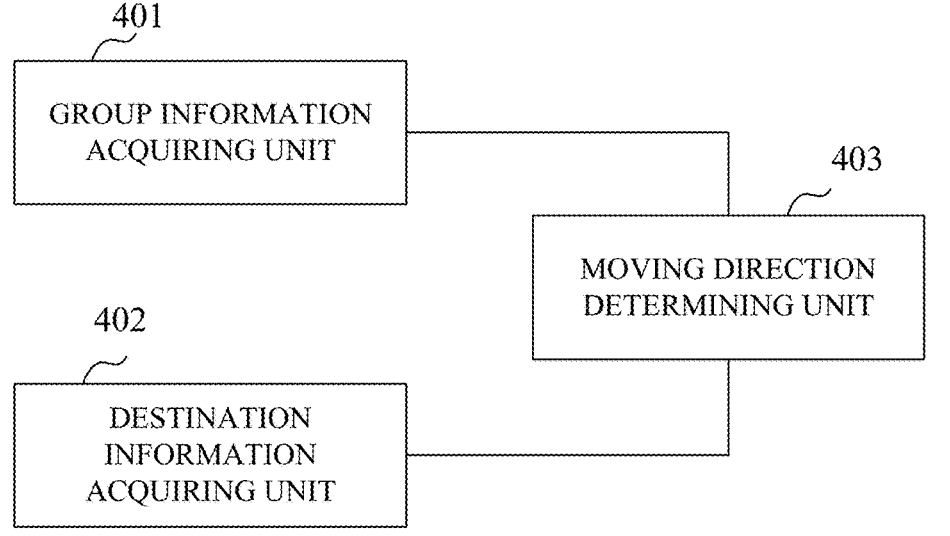
FIG. 4 illustrates the configuration of a CPU according to the first embodiment.

FIG. 4 is a block diagram illustrating the configuration of the CPU 301 according to this embodiment. The CPU 301 includes a group information acquiring unit (first acquiring unit) 401, a destination information acquiring unit (second acquiring unit) 402, and a moving direction determining unit (determining unit) 403. The group information acquiring unit 401 acquires information about a group (group information). The destination information acquiring unit 402 acquires destination information including information about the destination direction. The moving direction determining unit 403 determines the moving direction of the movable unit 102 based on the group information and destination information.

Figure 5:
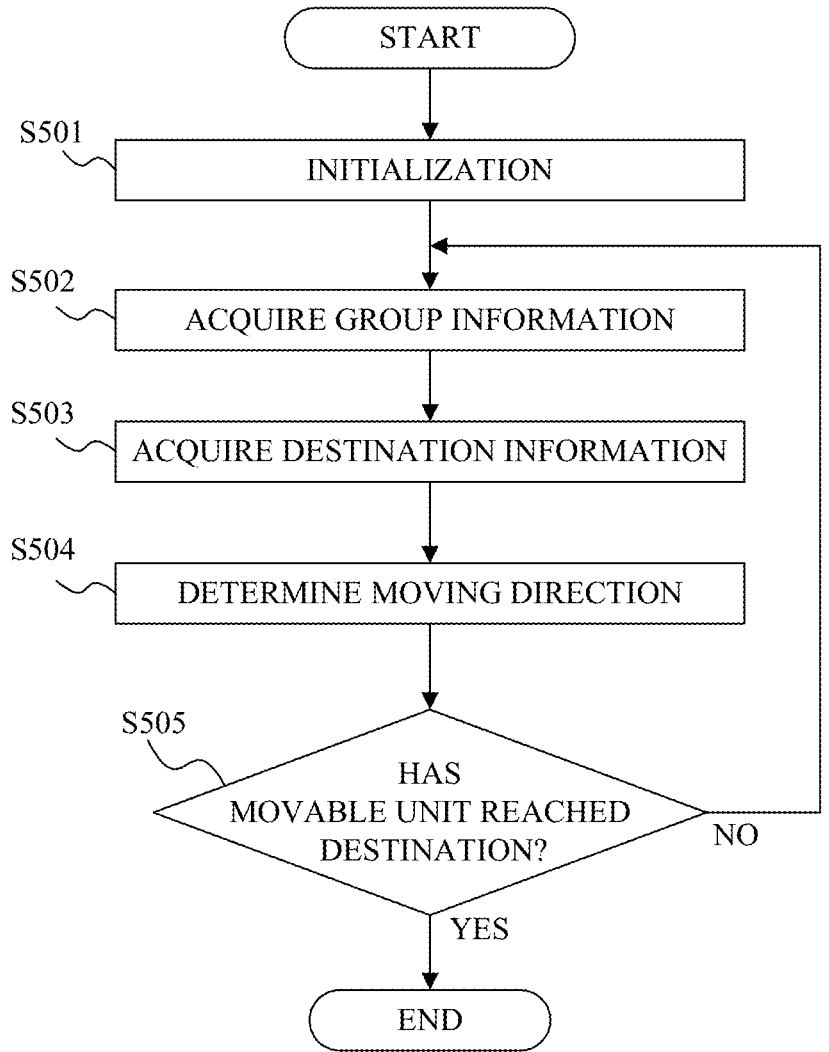
FIG. 5 is a flowchart illustrating the processing of the information processing apparatus according to the first embodiment.

FIG. 5 is a flowchart illustrating the processing of the information processing apparatus according to this embodiment. Assume that each processing illustrated in the flowchart is realized by the CPU 301 executing a control program. The start timing may be when the power of the movable unit 102 is turned on, or when the movable unit 102 starts moving.

In step S501, the CPU 301 initializes the information processing apparatus. More specifically, a program is read out of the external memory 304, and the information processing apparatus is activated. The destination of the movable unit 102 is set. The destination is a predetermined position to which the user is to move the movable unit 102, and may be set by specifying coordinate values in real space. Coordinate values of a captured image may be converted into the coordinate values of the real space using a coordinate conversion table representing the correspondence between the coordinate values of the captured image and the coordinate values of the real space. More specifically, the coordinate conversion table includes a rotation matrix for converting coordinate values of a captured image into coordinate values in real space, a translation vector, and values of a focal length and resolution of a camera, which are internal parameters of the camera.

In step S502, the input unit 305 receives an image captured by the camera, and the group information acquiring unit 401 acquires group information. The information received by the input unit 305 is not limited to captured images, and may also be information about moving images acquired by video imaging or satellite positioning using GPS. The camera and video are not limited to those mounted on the movable unit 102, and may use a surveillance camera and security camera located around the city. Information may be supplemented using images acquired by moving objects (including obstacles) existing around the movable unit 102.

In step S503, the destination information acquiring unit 402 acquires destination information.

In step S504, the moving direction determining unit 403 determines the moving direction of the movable unit 102 using the group information and destination information. More specifically, the moving direction determining unit 403 determines a direction in which the moving direction of the group and the destination direction are mixed (combined) at a fixed ratio (distribution) as the moving direction of the movable unit 102. The moving direction of the group is information about an average moving direction of the obstacles in the group, and may be obtained by the group information acquiring unit 401 using the group information, or may be obtained by the moving direction determining unit 403.

In step S505, the CPU 301 determines whether the movable unit 102 has reached the destination. In a case where the distance from the movable unit 102 to the destination is shorter than a predetermined value, the CPU 301 determines that the movable unit 102 has reached the destination, and ends this flow. In a case where the distance from the movable unit 102 to the destination is longer than a predetermined value, the CPU 301 executes the processing of step S501. In a case where the distance from the movable unit 102 to the destination is equal to a predetermined value, which step to proceed to can be arbitrarily set.

As described above, the configuration according to this embodiment moves the movable unit 102 in the direction determined in step S504. Thereby, the movable unit 102 can quickly reach the destination without taking a detour while collision avoidance is secured.

This embodiment causes each of the group information acquiring unit 401, the destination information acquiring unit 402, and the moving direction determining unit 403 to manage and store the above information, but is not limited to this example. The information processing apparatus may include a central management unit that collectively manages the above information. Consolidating each information in a central management unit enables each information to be easily grasped.

This embodiment has discussed a method for determining the moving direction of the movable unit 102, but in order to avoid collisions with obstacles in the group, the moving velocity of the movable unit 102 is set to a velocity similar to that of the group. More specifically, where $\theta$ is an angle between the moving direction of the movable unit 102 and the moving direction of the group, the velocity of the movable unit 102 is set to a velocity whose $\cos \theta$ component matches the velocity of the group.

Second Embodiment

This embodiment will discuss a method for adding a weight to at least one of the moving direction of the group and the destination direction, and for determining a combined direction as the moving direction of the movable unit. The overall processing flow according to this embodiment is similar to that of the first embodiment. This embodiment will discuss only processing procedures different from those in the first embodiment, and will omit similar procedures.

In step S504, at least one of the group information and the destination information is evaluated, and based on the evaluation result, the weight for at least one of the moving direction of the group and the destination direction is adjusted. More specifically, the shorter the distance from the movable unit to the destination is, the larger the weight in the destination direction is. At the same time, the weight for the moving direction of the group may be reduced. The weight may be adjusted so that the sum of the weight in the destination direction and the weight in the moving direction of the group becomes 1.

More specifically, the vector P as the moving direction of the movable unit 102 is calculated using the following equation (1):

$$P = w_{end}P_{end} + w_g P_g \qquad (1)$$

where wend is a weight for a destination vector. Pend is a vector indicating the destination direction (destination vector), $w_g$ is a weight for a vector indicating the moving direction of the group, $P_g$ is a vector indicating the moving direction of the group. The destination vector is a vector with a scalar of 1, which is obtained by dividing a difference between the position coordinates of the movable unit 102 and the position coordinates of the destination by its size. The vector indicating the moving direction of the group is also a vector with a scalar of 1.

Figure 6C:
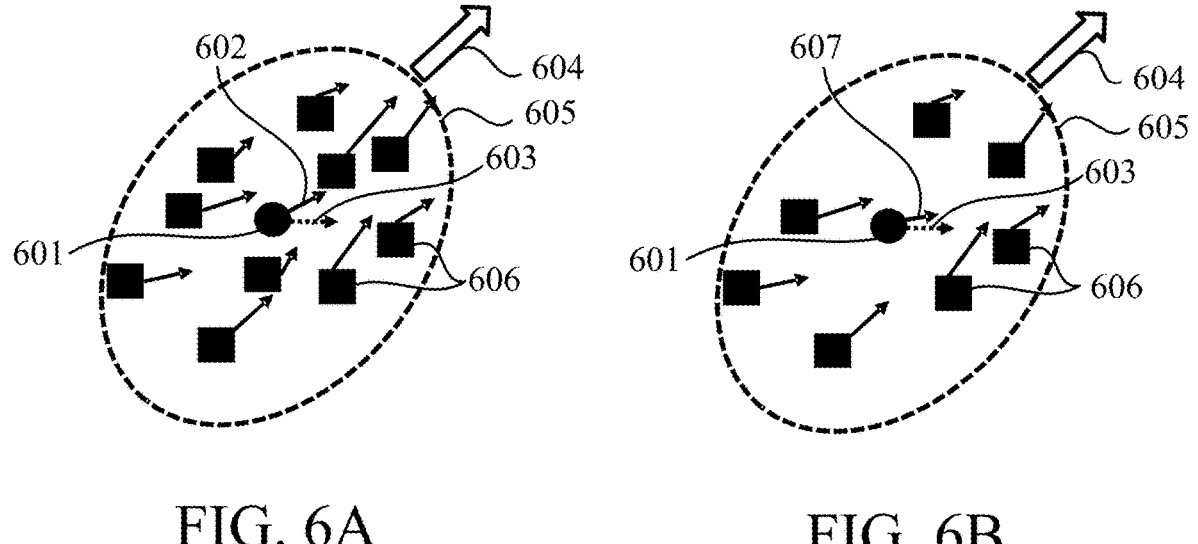
Figure 6C:
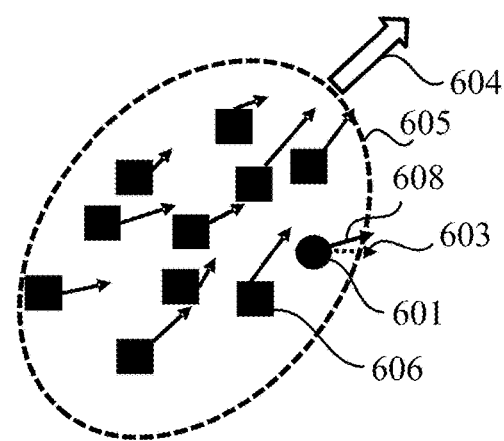

Referring now to FIGS. 6A, 6B, and 6C, a description will be given of an evaluation target and evaluation method of the group information and destination information according to this embodiment. FIGS. 6A, 6B, and 6C are conceptual diagrams for explaining a weight determination pattern according to this embodiment.

FIG. 6A illustrates an example in which the density of obstacles 606 in a group 605 is high. In FIG. 6A, an adjustment is highly necessary so that the movable unit 601 does not collide with the obstacles 606 in the group 605. Therefore, the weight for the destination vector 603 is reduced, and a direction of a vector that is a combination of the vector 604 indicating the moving direction of the group 605 and the destination vector 603 is set as a moving direction 602 of the movable unit 102.

FIG. 6B illustrates an example in which the density of obstacles 606 in the group 605 is low. In FIG. 6B, in comparison with FIG. 6A, there is less need for adjustment so that the movable unit 601 does not collide with the obstacles 606 in the group 605. Therefore, the weight for the destination vector 603 is increased, and a direction of a vector that is a combination of the vector 604 indicating the moving direction of the group 605 and the destination vector 603 is set as a moving direction 607 of the movable unit 601.

As described above, in FIG. 6A, the movable unit 601 is located at the center of the group 605, and the obstacles 606 in the group 605 exist in all directions, so the weight for the destination vector 603 is not increased. In FIG. 6C, the movable unit 601 is located on the destination side of the group 605, and the obstacles 606 in the group 605 are located only on the opposite side of the destination. Therefore, the weight for the destination vector 603 is increased, and the direction of the vector that is a combination of the vector 604 indicating the moving direction of the group 605 and the destination vector 603 is set as a moving direction 608 of the movable unit 601.

As discussed, the configuration according to this embodiment determines the moving direction of the movable unit 102 in step S504 that is determined in accordance with the moving status of the movable unit. Thereby, the movable unit 102 can reach the destination faster than a case where the moving direction is a combination of the moving direction of the group and the destination direction at a fixed ratio.

This embodiment increases the weight in the destination direction as the distance from the movable unit 102 to the destination becomes shorter, but is not limited to this example. For example, in order for the movable unit 102 to approach the destination in a case where the distance from the movable unit 102 to the destination is long, the weight in the destination direction may be maximized. As the distance to the destination becomes shorter, the weight in the destination direction may be decreased. The weight may be added based on other information. For example, as the density of the group becomes lower, the weight in the destination direction may be increased, and as a difference between the coordinates of the movable unit 102 and the coordinates of the boundary on the destination side of the group approaches 0, the weight in the destination direction may be increased. These methods may be performed simultaneously to increase the weight.

Third Embodiment

This embodiment will discuss a method for determining as a moving direction of the movable unit a combination direction of a moving direction of a group and a moving direction of a subgroup (or small group) that exists in the group, moves in a direction closer to the destination direction than the moving direction of the group, and has a size smaller than that of the group or a single moving object.

Figure 7:
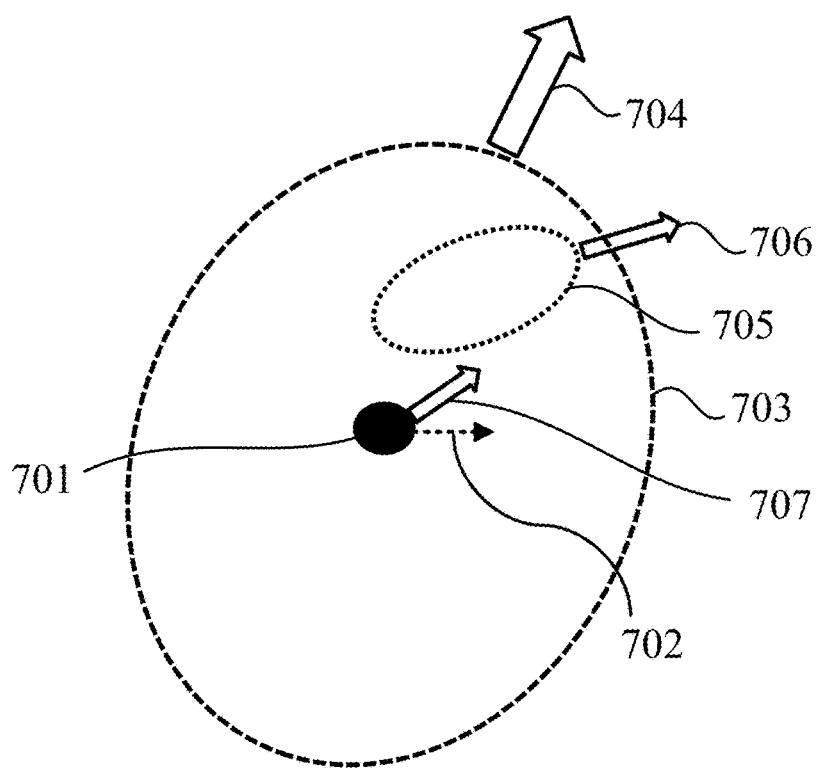
FIG. 7 is a conceptual diagram for explaining a moving direction of a subgroup (small group) according to a third embodiment.

FIG. 7 is a conceptual diagram for explaining the moving direction of the subgroup in this embodiment. In FIG. 7, a movable unit 701 moves in a direction 707 that is a combination of a moving direction 704 of a group 703 and a moving direction 706 of a subgroup 705, which is closer to a destination direction 702 than the moving direction 704. Being close to the destination direction 702 means that an angle between a straight line parallel to the moving direction 706 and a straight line parallel to the destination direction 702 is smaller than an angle between a straight line parallel to the moving direction 704 and the straight line parallel to the destination direction 702.

The overall processing flow according to this embodiment is similar to that of the first embodiment. This embodiment will discuss only processing procedures different from those in the first embodiment, and will omit similar procedures.

Figure 8:
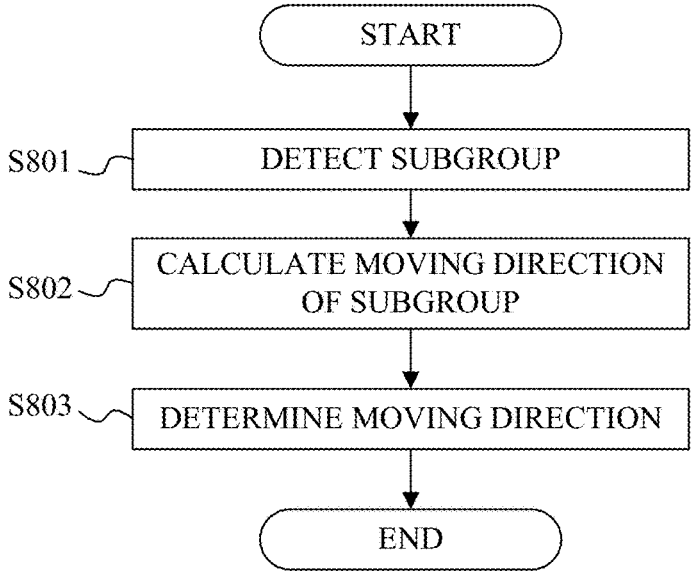
FIG. 8 is a flowchart illustrating the processing of the information processing apparatus according to the third embodiment.

FIG. 8 is a flowchart illustrating details of the processing of determining the moving direction in step S504 in FIG. 5 according to this embodiment.

In step S801, the CPU 301 detects a subgroup. More specifically, using the information acquired in steps S502 and S503, the CPU 301 uses the moving direction of the group as a reference, and detects a region of moving objects moving closer to the destination within the group than the reference. The subgroup includes one or more moving objects. In addition, the detection method may use, for example, a method for calculating a temporal average of captured images and its standard deviation, and for detecting as a subgroup a part where a change exceeds a threshold and a part that moves closer to the destination than the reference.

In step S802, the CPU 301 calculates an average moving direction of the obstacles in the subgroup detected in step S801 as the moving direction of the subgroup.

In step S803, the CPU 301 determines the moving direction of the movable unit based on the moving direction of the subgroup calculated in step S802 and the moving direction of the group calculated based on the group information acquired in step S502. More specifically, the CPU 301 determines as the moving direction of the movable unit a direction in which the moving direction of the subgroup and the moving direction of the group are mixed at a fixed ratio.

This embodiment determines as the moving direction of the movable unit a direction in which the moving direction of the subgroup and the moving direction of the group are mixed at the fixed ratio, but is not limited to this example. For example, the direction in which the subgroup exists when viewed from the movable unit may also be taken into consideration in determining the moving direction. More specifically, the direction in which the subgroup exists when viewed from the movable unit, which is calculated using the position information about the movable unit and the position information about the subgroup, and the direction in which the moving direction of the subgroup and the moving direction of the group are mixed at the fixed ratio may be further mixed at a fixed ratio and determined as the moving direction of the movable unit. Taking into consideration the direction in which the subgroup exists when viewed from the movable unit enable the movable unit to join the subgroup. Thereby, the movable unit can move to the destination while a likelihood of collision with surrounding objects is less than a case where the movable unit moves alone in the group.

Joining the subgroup may be prioritized. More specifically, in a case where a distance between the movable unit and the subgroup is less than a threshold, the movable unit can join the subgroup by determining the direction in which the subgroup exists when viewed from the movable unit as the moving direction of the movable unit. Thereby, the movable unit can move to the destination while the likelihood of collision with surrounding movable units is reduced.

A weight may be added to at least one of the moving direction vector of the subgroup, the moving direction vector of the group, and the direction vector of the subgroup when viewed from the movable unit, and a direction of the combined vector may be set as the moving direction of the movable unit. More specifically, the combined vector P is calculated using the following equation (2):

$$P = w_g P_g + w_s P_s + w_{sm} P_{sm} \qquad (2)$$

where $w_g$ is a weight for a vector indicating the moving direction of the group, $P_g$ is the vector indicating the moving direction of the group, $w_s$ is a weight for a vector indicating the moving direction of the subgroup, $P_s$ is the vector indicating the moving direction of the subgroup, $w_{sm}$ is a weight for a vector indicating the moving direction of the subgroup when viewed from the movable unit, and $P_{sm}$ is the vector indicating the moving direction of the subgroup when viewed from the movable unit.

The weights are adjusted based on the acquired group information and destination information. More specifically, as the distance to the destination becomes shorter, the weight for at least one of the vector indicating the moving direction of the subgroup and the vector indicating the moving direction of the subgroup when viewed from the movable unit may be increased. In addition, as a period from the current time to the expected arrival time to the destination or the time when the movable unit is to reach the destination is shorter (approaches 0), the weight for at least one of the vector indicating the moving direction of the subgroup and the vector indicating the moving direction of the subgroup when viewed from the movable unit may be increased. As the density of the group decreases, the weight for at least one of the vector indicating the moving direction of the subgroup and the vector indicating the moving direction of the subgroup when viewed from the movable unit may be increased. In a case where a distance between the movable unit and the subgroup is shorter than the threshold, the likelihood of collision with obstacles around the movable unit is low, and thus the weight for the vector indicating the moving direction of the subgroup when viewed from the movable unit may be increased. The weights described above may be adjusted simultaneously, or the weights may be adjusted so that the sum of the weights becomes 1.

As mentioned above, by determining the direction calculated according to the moving status of the movable unit as the moving direction, the movable unit can reach the destination faster while the likelihood of collision is lower than that a case that determines as the moving direction the direction mixed at a fixed ratio or a simply added direction.

As described above, the configuration according to this embodiment moves the movable unit in the moving direction of the subgroup, which is moving in a direction closer to the destination direction than that of the group. Thereby, the movable unit can reach the destination faster without taking a detour while the likelihood of colliding with surrounding obstacles is suppressed.

Fourth Embodiment

This embodiment will discuss a method for determining the moving direction of the movable unit based on the collision avoiding direction, thereby further reducing the risk (likelihood) of collision, and allowing the movable unit to reach the destination faster. The collision avoiding direction is a direction in which the movable unit and an obstacle existing around the movable unit move away from each other when they approach each other in order to prevent a collision.

Figure 9:
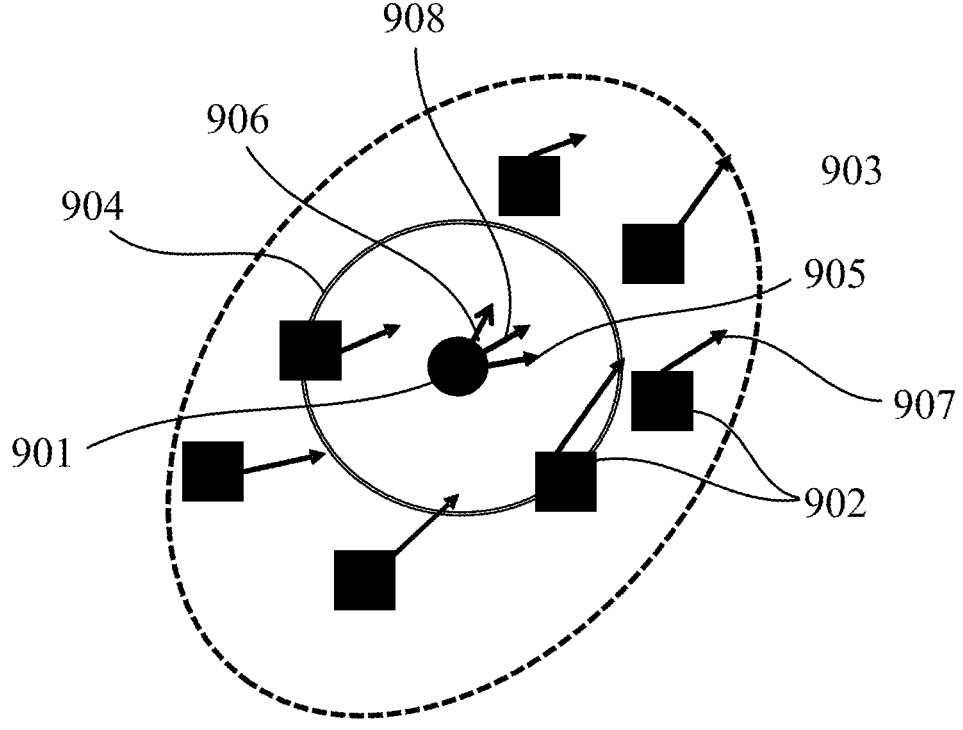
FIG. 9 is a conceptual diagram for explaining a collision avoiding vector according to a fourth embodiment.

Referring now to FIG. 9, a description will be given of the collision avoiding direction according to this embodiment. FIG. 9 is a conceptual diagram for explaining the collision avoiding direction. Assume that the destination of a movable unit 901 is located in the right direction. Reference numeral 902 denotes an obstacle that exists around the movable unit 901. Reference numeral 903 denotes a region considered to be a group. Reference numeral 904 indicates an influential region as a region that includes obstacles that are considered to have a high risk of collision. In this embodiment, the influential region is set to a circle with a radius of 1 m around the movable unit as a center. The shape and size of the influential region can be freely set. Reference numeral 905 denotes a moving direction calculated based on group information and destination information. Reference numeral 906 denotes a collision avoiding direction. Reference numeral 907 denotes a moving direction of the obstacle 902. Reference numeral 908 denotes a moving direction of the movable unit 901 after the moving direction 905 and the collision avoiding direction 906 are combined. In this embodiment, a direction opposite to the direction from the movable unit 901 to the position of the obstacle 902 existing within the influential region 904 is determined as the collision avoiding direction.

The overall processing flow according to this embodiment is similar to that of the first embodiment. This embodiment will discuss only processing procedures different from those in the first embodiment, and will omit similar procedures.

In step S504, the CPU 301 first calculates a direction based on at least one of the group information acquired in step S502 and the destination information acquired in step S503, and a collision avoiding direction based on the group information acquired in step S502. The CPU 301 determines a bisector direction of an angle between these directions as the moving direction of the movable unit. This embodiment determines as the collision avoiding direction a direction of a collision avoiding vector calculated using the vector P indicating the moving direction of the movable unit. A collision avoiding vector $P_c$ is calculated by the following equation (3) using the vector P indicating the moving direction of the movable unit, and $P_i$ (i=0, 1, . . . , n) indicating a moving direction of each obstacle that exists in the influential region:

$$P_c = \sum_i^n \frac{P_i - P}{|P_i - P|} \tag{3}$$

where n is the number of obstacles existing within the influential region.

As described above, the configuration according to this embodiment considers the collision avoiding direction, and thus enables the movable unit to reach the destination faster while reducing the risk of collision.

This embodiment determines as the moving direction of the movable unit the bisector direction of the angle between the direction calculated based on at least one of the group information and the destination information and the collision avoiding direction, but is not limited to this example. A weight may be added to at least one of the direction calculated based on at least one of the group information and the destination information and the collision avoiding direction, and the combined direction may be determined as the moving direction of the movable unit. More specifically, a direction of a vector P' indicating the moving direction of the movable unit calculated by the following equation (4) may be determined as the moving direction of the movable unit:

$$P' = w_c P_c + wP \tag{4}$$

where $w_c$ is a weight of the collision avoiding vector, $P_c$ is a collision avoiding vector, w is a weight for a vector indicating a direction calculated based on at least one of the moving direction of the group and the destination direction, and P is a vector indicating a direction calculated based on at least one of the moving direction of the group and the destination direction.

The weights are adjusted based on the acquired group information. More specifically, the weight for the collision avoiding vector may be decreased as the risk of collision with obstacles existing around the movable unit is lower. The case where the risk of collision with obstacles existing around the movable unit is low is, for example, a case where the density of the group is lower than a predetermined value, a case where the density of the influential region is lower than a predetermined value, a case where an angle between the moving direction of an obstacle within the influential region and the destination direction is 90°, a case where the obstacle within the influential region is not moving to the destination, or a case where the velocities of the movable unit and the group are low (approaching 0). The weight for the moving direction vector P may be reduced at the same time. The weight may be adjusted so that the sum of the weight for the moving direction vector and the weight for the collision avoiding vector becomes 1.

Information other than the collision avoiding direction may be used to improve collision avoiding performance. The shape of the movable unit is not necessarily square, and some movable units are horizontally long or vertically long. Therefore, depending on the moving direction of obstacles that exist around the movable unit, the orientation (attitude) of the movable unit is changed toward the collision avoiding direction as closely as possible so as to improve the collision avoiding performance. More specifically, in a case where the width of an area to which the movable unit is moving is narrow due to obstacles, the orientation of the movable unit may be changed so that the narrower side of the movable unit is in front.

The collision avoiding performance can be improved by changing a measurement range of a collision detecting sensor depending on the obstacles present around the movable unit. More specifically, by setting the destination direction as a reference, a region in a direction opposite to the moving direction of the group may be expanded in proportion to the velocity of the group. Since the object detecting sensitivity increases by reducing a threshold, the threshold of the sensor in the above region may be reduced in inverse proportion to the velocity of the group.

The threshold may be lowered based on the characteristics of obstacles existing around the movable unit, and weights other than the moving direction of the group may not be increased. More specifically, upper and lower thresholds are provided to the velocity. In a case where obstacles around the movable unit are slower or faster than the thresholds, the threshold of the collision detecting sensor is reduced to increase object detecting sensitivity, or weights other than the moving direction of the group are not increased. In addition, a threshold is provided to the velocity change per unit time. In a case where the velocity change per unit time of obstacles around the movable unit exceeds the threshold, the threshold of the collision detecting sensor is reduced to increase the object detecting sensitivity, or weights other than the moving direction of the group are not increased. A threshold is set for the size of the movable unit. In a case where the size of obstacles around the movable unit is larger than the threshold, the threshold of the collision detecting sensor is reduced to increase the object detecting sensitivity, or weights other than the moving direction are not increased.

Each embodiment has discussed a method for determining a direction based on the moving direction of the group and the destination direction as the moving direction of the movable unit, but may improve the collision avoiding performance by notifying the surroundings that the movable unit move in the determined moving direction. More specifically, the moving direction data may be sent to obstacles around the movable unit. The notification may be given to the surroundings by flashing a light in the moving direction or informing the moving direction by voice. This configuration can improve the collision avoiding performance more effectively because the surrounding moving objects can recognize the moving direction of the movable unit, than a case where the movable unit simply utilizes a direction in which the collision avoiding performance is improved.

The second to fourth embodiments determine the moving direction of the movable unit, but may determine the velocity of the movable unit. To avoid collisions, this implementation stores a velocity vector component similar to that of the group. More specifically, a velocity at which an orthogonal projection component of the velocity vector of the movable unit onto the velocity vector of the group matches the velocity vector component of the group may be determined as the velocity of the movable unit.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each embodiment can provide an information processing apparatus that enables a movable unit to reach a destination faster while securing collision avoiding performance.

This application claims priority to Japanese Patent Application No. 2023-103128, which was filed on Jun. 23, 2023, and which is hereby incorporated by reference herein in its entirety.

What is claimed is:

1. An information processing apparatus comprising:
a memory storing instructions; and
a processor configured to execute the instructions to:

acquire information about a group consisting of a plurality of objects that exist around a movable unit and are each configured to be movable;
acquire information about a direction from the movable unit to a destination; and
determine a moving direction of the movable unit according to an average moving direction of the plurality of objects acquired using the information about the group and information about the direction from the movable unit to the destination.

2. The information processing apparatus according to claim 1, wherein the processor is configured to add a weight to at least one of the average moving direction or the direction from the movable unit to the destination in determining the moving direction of the movable unit.

3. The information processing apparatus according to claim 2, wherein the processor is configured to increase the weight for the direction from the movable unit to the destination as a distance from the movable unit to the destination reduces.

4. The information processing apparatus according to claim 2, wherein the processor is configured to increase the weight for the direction from the movable unit to the destination as a period from current time to expected time for the movable unit to reach the destination or time when the movable unit is to reach the destination reduces.

5. The information processing apparatus according to claim 2, wherein the processor is configured to increase the weight for the direction from the movable unit to the destination as density of the objects in the group reduces.

6. The information processing apparatus according to claim 2, wherein the processor is configured to increase the weight for the direction from the movable unit to the destination as the movable unit is closer to a boundary on a destination side of the group.

7. The information processing apparatus according to claim 1, wherein the processor is configured to determine the moving direction of the movable unit according to the information about the group and information about a subgroup consisting of one or more of the plurality of objects moving in a direction closer to the direction from the movable unit to the destination than the average moving direction.

8. The information processing apparatus according to claim 7, wherein the processor is configured to determine the moving direction of the movable unit according to the average moving direction acquired using the information about the group and the information about the subgroup.

9. The information processing apparatus according to claim 1, wherein the information about the group includes at least one of position information about each object, information about a velocity of each object, information about a density of the group, position information about the movable unit within the group, or information about the number of the objects.

10. The information processing apparatus according to claim 1, wherein the processor is configured to acquire at least one of a distance from the movable unit to the destination, expected time for the movable unit to reach the destination, or time when the movable unit is to reach the destination.

* * * * *